Nov. 15, 1932. J. W. MARTIN, JR 1,887,693
REFRIGERATING APPARATUS AND METHOD
Original Filed June 15, 1926  2 Sheets-Sheet 1
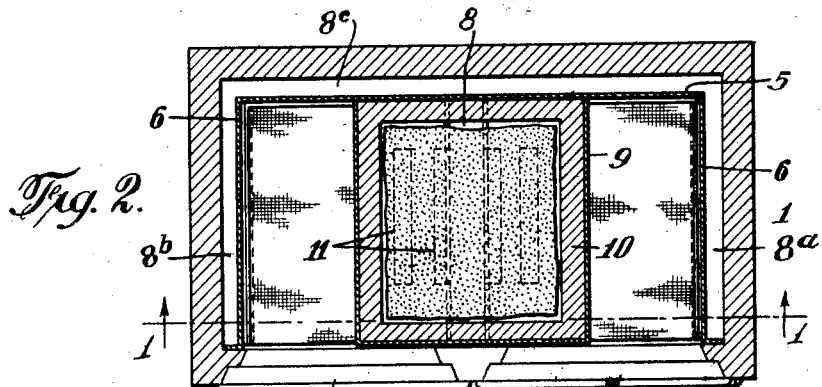
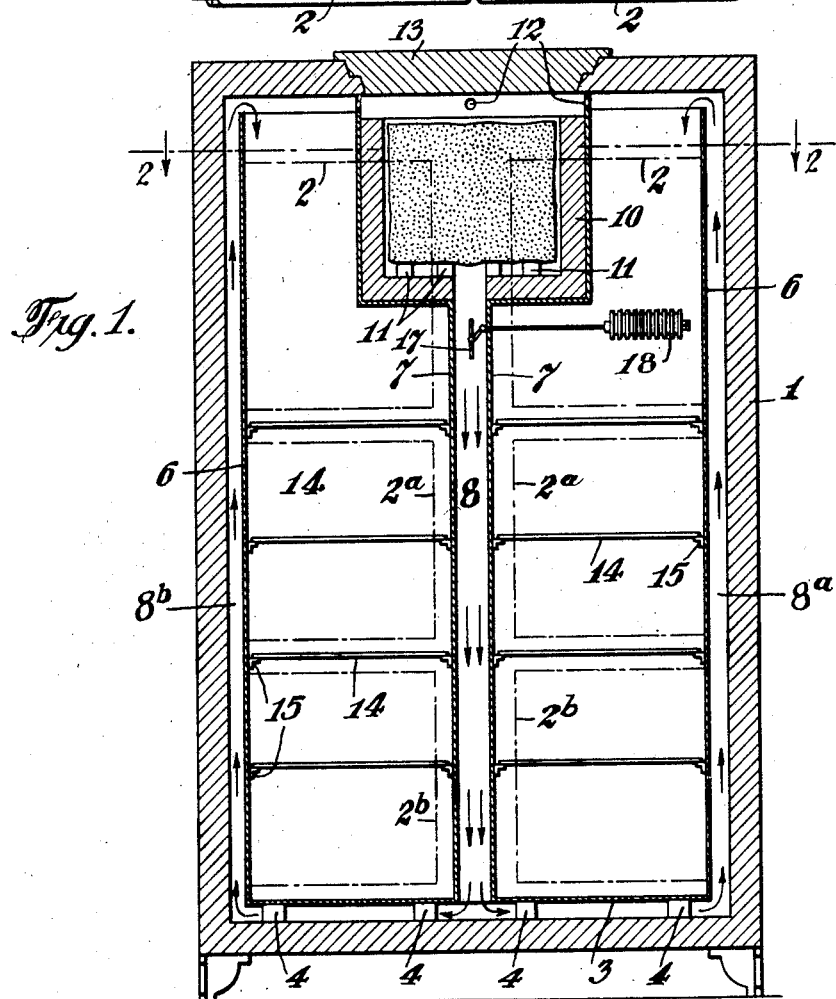
INVENTOR
James W. Martin Jr.
BY
George C. Dean
ATTORNEY Nov. 15, 1932.  J. W. MARTIN, JR  1,887,693
REFRIGERATING APPARATUS AND METHOD
Original Filed June 15, 1926  2 Sheets-Sheet 2
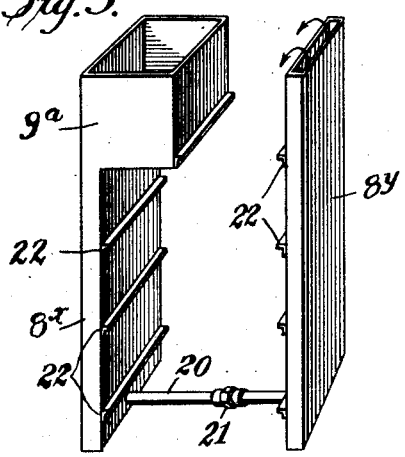
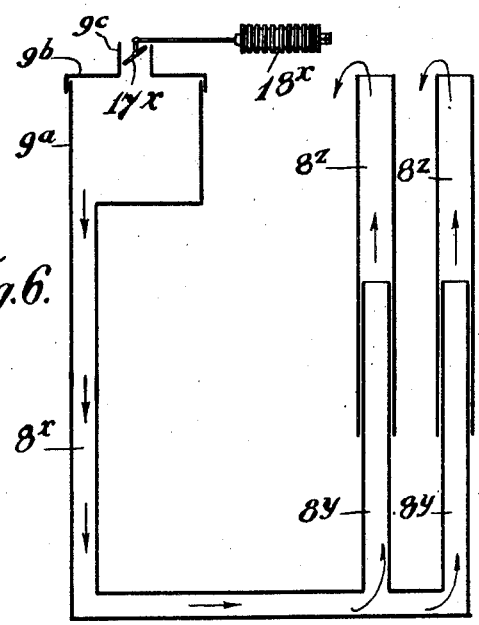
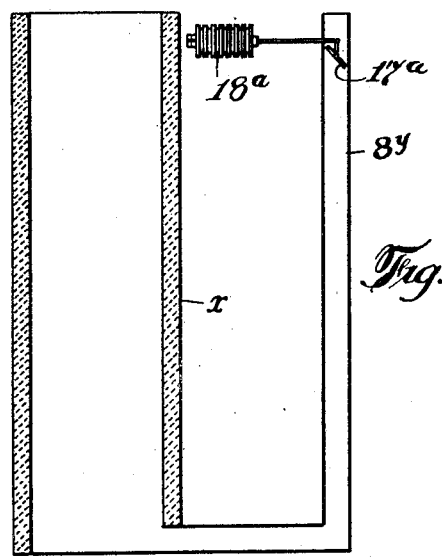
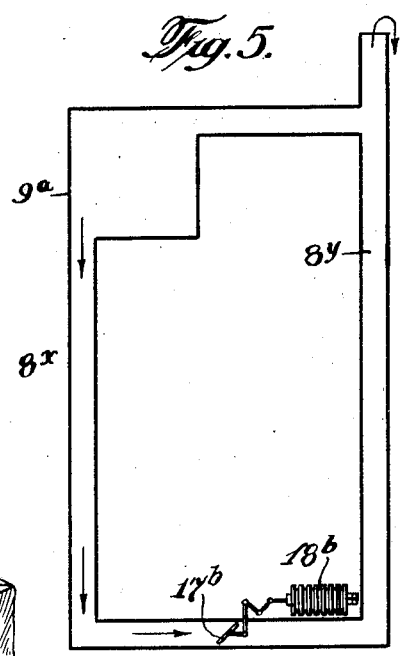
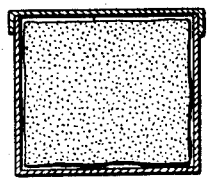
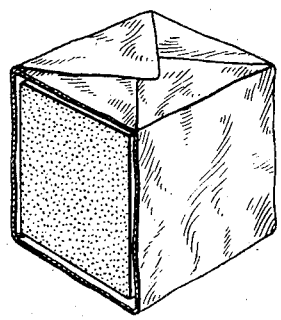
INVENTOR
James W. Martin Jr.
BY
George C. Alean
ATTORNEY Patented Nov. 15, 1932

1,887,693

UNITED STATES PATENT OFFICE

JAMES W. MARTIN, JR., OF YONKERS, NEW YORK, ASSIGNOR TO DRYICE EQUIPMENT CORPORATION, OF NEW YORK, N. Y., A CORPORATION OF DELAWARE

REFRIGERATING APPARATUS AND METHOD

Original application filed June 15, 1926, Serial No. 116,103. Divided and this application filed March 21, 1930. Serial No. 437,652.

This application is a division of my application Ser. No. 116,103, filed June 15, 1926, and includes all the novel features that are patentably distinguishable from the claims of prior applications that are about to issue as Patents Nos. 1,752,015, 1,752,276 and 1,752,277.

The invention relates to methods of and apparatus for solving certain special problems presented by attempts to employ solid carbon dioxide for ordinary commercial refrigerating purposes. Commercially, solid carbon dioxide in relatively dense form is made either by freezing the liquid directly to the solid blocks or by expanding the liquid to so-called snow, which is then compressed into blocks of desired density. Among the unique factors involved in the use of such refrigerant are the following:

(1) The solid carbon dioxide melts or rather sublimates directly to a gas, without any intermediate state.

(2) The volume of the gas evolved is approximately 500 times the volume of the block, normally about 8 cubic feet per pound of the solid carbon dioxide, that is, where the block has a density or about 65 pounds per cubic foot.

(3) The temperature of the sublimated gas while nominally, approximately 114° F. below zero, may vary within wide limits above and below this temperature, which may be roughly indicated as somewhere between —85° F. and —140° F.

(4) This wide variation of temperature is the result of an accelerated or retarded sublimating rate, and while the temperature variation so caused is of utility and importance in my present invention, the acceleration and retarding of the sublimating rate and the factors controlling the same are of even greater importance.

(5) In considering these, heat insulation may be disregarded because it is well understood that the sublimating rate will be greater or less according as the heat insulation is greater or less.

(6) The present problems concern the active or dynamic factors of sublimating rate, which are:

(a) Convection of the heat by circulation of the air or gas within the refrigerated space;

(b) The enormously variable insulation afforded by the atmosphere within said space according as it is comprised mainly of the carbon dioxide gas or mainly of air.

(7) The unique factor in the control of accelerated or retarded melting rate is what is known as partial pressure. In an atmosphere of pure carbon dioxide gas, the rate of evaporation is minimized and the corresponding temperature of the gas may approximate the upper limit, whereas in a constantly maintained atmosphere of pure air, the melting rate is greatly accelerated and the temperature of the gas approaches the lower limit. That is to say, pure air has an effect similar to that of a perfect vacuum in accelerating the melting rate and any percentage admixture of air in a carbon dioxide atmosphere has an effect similar to that of a corresponding partial vacuum.

As related to the practical problems of my present invention, the object is to maintain a relatively pure atmosphere of carbon dioxide gas, for the double purpose of retarding evaporation rate and maintaining high insulating value. This is accomplished by properly controlling the flow of the great volumes of gas per unit of solid that is evaporated, while at the same time gradually and diffusely applying refrigerated values of the fresh gas by conduction, to modify the temperature of the gas and prevent over-refrigeration upon discharge thereof into the refrigerated space.

One object of my invention is to establish a heat absorbing circuit of approximately a pure gas, affording maximum insulation, adjacent exterior walls of the refrigerated space. A special feature is the arrangement of the heat absorbing and insulating circuit of said approximately pure gas to serially include a down-leg of circulation of the gas evaporated from the solid carbon dioxide, terminating in an up-leg in counterbalancing relation so that the down and up circuit functions as a heat absorbing thermostat. While the up-leg may discharge into the outer air, as in one special form of my apparatus, it preferably discharges into the refrigerated space upon escaping from the thermostatic circuit; being relatively pure gas it flows down to the bottom of said space, displacing the air upward. The 500 volumes of gas per unit solid of the above density are thus most efficiently employed to expel air from the top of the refrigerated space. Obviously, evaporation of a cubic foot of such solid would wash out a refrigerated space 2′×3′×4′, twenty-five or thirty times during the evaporation period.

An important practical point is that commercial refrigerating apparatus of all kinds is very apt to have leaks whereby the pure gas, being very heavy, is apt to drain out and unless the melting rate greatly exceeds the leaking rate, air will be drawn in at the higher level leaks. Any such inleak of air, even a small percentage, has a remarkable effect in decreasing the insulation value of the gas, but in the preferred form of my invention, this is compensated for by the phenomenal acceleration of gas evolution proportional to the percentage of air in the refrigerated space. This is one of the reasons why there are certain advantages in having the gas overflowing from the up-leg of the circulation discharge into the refrigerated space, thereby tending to force air into the top of the space containing the solid carbon dioxide. Thus, under emergency conditions, the greater the amount of the relatively light, relatively non-insulating air, the more rapidly will gas be evolved to drive out that air.

By the above and other proper methods of utilizing the above described factors of commercial refrigeration of solid carbon dioxide, it has been demonstrated that the solid carbon dioxide, though having less than twice the refrigerant value of water ice, may be made to afford from ten to twenty or more times the refrigerating efficiency of the latter.

From the above it will be understood that my invention involves certain advantages never before attained in connection with carbon dioxide refrigeration as concerns modifying the temperature of the gas and applying its refrigerant value in such a way as to minimize danger of over-refrigeration of food and similar products within the refrigerator. Preferably, the carbon dioxide refrigerant is in a compartment in the top of the refrigerator, whence the heavy gas flows downward in a central conduit entirely within the refrigerated space. This downflow path is preferably the interspace between the walls of a central partition, which preferably extends from front to rear of the refrigerator and down to a bottom space, through which the gas flows laterally to and up through draft passages between the outer refrigerator shell, and the inner shell which encloses the refrigerated space. When the gas reaches the top of this interspace, it spills freely over into the food-containing body portion of the refrigerator, where it naturally settles downward through all of the compartments toward the bottom thereof, displacing warmer carbon dioxide or air upward. In this way, the inner metal shell is refrigerated by the primary downflow in the central partition and then is both refrigerated and heat-insulated by the countercurrent flow of gas in the exterior interspace between the inner shell and the exterior refrigerator casing. The primary downflow through the central partition takes effect entirely within and surrounded by the refrigerated space, while the flow across the bottom and up the sides and back operates to refrigerate and insulate the outer shell, with the very important advantage of also very substantially raising the temperature of the gas before it is discharged into the inner refrigerator space containing the products that are to be refrigerated.

While the upper compartment containing the solid carbon dioxide may be closed so that the above described circulation is forced by the pressure of the generated gas, the more specific claims of my present application contemplate leaving both the entrance and exit of the flow circuit vented to atmosphere within the refrigerator so that the circulation will be mainly static, that is to say, the gas is left free to spill over the top of the refrigerant chamber, but it does not do so because the down-column being naturally colder and more dense than the up-column will establish an unbalanced condition whereby the gas will be forced out from the top of the upflow column, until said upflow column becomes as cold as the downflow column. Moreover, the quantity of the flow will be automatically controlled by and in accordance with the difference in temperature between the downflow column and the upflow column, diminishing to zero when the up-column is as cold as the down-column and increasing to a maximum according as the up-column becomes warmer. Therefore, in normal operation, the carbon dioxide gas will not spill over the upper edge of the solid carbon dioxide containing compartment even though the latter be vented or entirely open. Moreover, when the above described thermostatic circulation is active, gas, with such percentage of air as has not been expelled from the top of the refrigerator, may be drawn downward into the solid carbon dioxide compartment, thereby accelerating the melting of the solid until the circulation is automatically checked by lowering temperature and by the increasing percentage of carbon dioxide gas, thereby increasing density of the up-column.

In actual practice, I find this automatic thermostatic control is so perfect that desired temperatures, above freezing, may be maintained in the ordinary domestic refrigerator merely by predetermining the amount and gas-tightness of paper, pasteboard or other insulating wrappings for the solid carbon dioxide or for the walls of the refrigerant box. In this way, I have very satisfactorily operated a domestic refrigerator normally requiring 75 pounds of water ice per day on 6 pounds of solid carbon dioxide per day.

Considering the counterbalancing downflow and upflow columns as an automatic self-controlling thermostatic instrument, it will be evident that further and more accurate adjustment for given ranges of temperature may be had by making the upflow column somewhat shorter than the downflow column, and it is even possible to make the upflow column somewhat higher than the downflow column, so that the gas will spill from the top of the upflow column only when the latter is very much warmer than the downflow column.

If design of the areas and cross-sections in combination with insulation is insufficient to secure a high enough maximum speed of circulation, I prefer to employ valves either in the down-column or the cross-connection or the up-column, controlled manually or by well known thermostatic elements, such as bi-metallic strips or metallic bellows tubes. The natural self-regulating quality of the counterbalanced columns may thus be subject to arbitrary control.

When thermostats are used, the sublimating rate of the solid may be controlled and determined, according to a fundamentally new method:

The upper part of the down-column containing the solid carbon dioxide is heavily insulated, but the solid therein is entirely uninsulated and a thermostatic valve is arranged to control downflow of the cold gas from the refrigerant in the down-column either by cutting it off entirely or limiting it to a small predetermined minimum. In this situation, the insulated walls plus the cold carbon dioxide remaining in the box and operating as effective insulating for the solid, will normally minimize melting, but whenever the thermostatic valve is open, this extremely heavy gas will fall rapidly in the down-column, drawing air into the top of the refrigerant box. I have discovered that such partial or complete substitution of air for carbon dioxide in contact with the solid has the remarkable effect of lowering its sublimating point from say $-110°$ F. to $-130°$ or $-140°$ F. and in this change in temperature a very considerable amount of carbon dioxide is evaporated. This plus the sensible heat of the air may increase the evaporation rate from say 5% or 10% up to say, 40% or 50% per 24 hours.

I believe I am the first to utilize and effectively control air, as a factor in determining the rate of melting of solid carbon dioxide, and particularly to eliminate this factor to any desired extent by predetermining the amount and gas-tightness of paper, pasteboard or other insulating wrappings for the solid carbon dioxide, thereby protecting it from actual contact with the circulating gas-air mixtures.

While the arrangement of the down-flow column as a central partition in the refrigerator with two counter-balancing upflow columns in the outer walls, is a desirable arrangement, I find that it is entirely practicable to have only two columns, the downflow column being an outer wall of the refrigerator, the same as the upflow column.

While the above system may be built into a refrigerator, an important practical feature of my invention as disclosed herein is its adaptability for handy and inexpensive application to the interiors of ordinary ice refregerators. For such purposes, the down-column with refrigerant box at the top thereof may be constructed in one piece, fitted against one side of the refrigerator chamber, and the up-column in another piece, fitting against the other side with a cross-connection in the bottom in the form of ordinary piping with detachable coupling.

The above and other features of my invention will be more evident from the following description in connection with the accompanying drawings, in which Figs. 1 and 2 are sections showing my invention as applied to a refrigerator of the domestic type, Fig. 1 being a vertical section on the line 1—1, Fig. 2, and Fig. 2 a horizontal section on the line 2—2, Fig. 1;

Fig. 3 is a perspective view showing a modified form of apparatus for the practice of my invention, adapted to be fitted into a domestic refrigerator of ordinary type;

Figs. 4, 5 and 6 are diagrammatic views of other modifications showing the paths of flow of the carbon dioxide gas and various points at which thermostatically controlled valves may be applied; and Figs. 7 and 8 are conventional views showing solid carbon dioxide as enclosed, respectively, in pasteboard and paper wrappings affording a predetermined amount and gas-tightness for protection of the solid carbon dioxide.

In Figs. 1 and 2, a domestic refrigerator of the upright type is conventionally indicated as comprising a box-like structure, 1, the walls of which are of any suitable heat insulating construction, having in the front face thereof upper doors, 2, 2, middle doors, 2a, 2a, and lower doors, 2b, 2b. In order to adapt such a box for operation in accordance with my present method, it is only necessary to fit therein a lining structure which may be of sheet metal, and sufficiently smaller than the interior of the box of the refrigerator, to leave the required upflow passages between said lining and the interior walls of said box. The lining structures may comprise a bottom, 3, resting on suitable supporting blocks, 4, parallel with the floor, a back, 5, parallel with the back of the refrigerator and sides, 6, 6, parallel with the sides of the refrigerator, with a central partition comprising spaced apart walls, 7, 7, providing a downflow passage, 8, leading from a solid carbon dioxide container, 9, which latter is preferably protected by wood or other insulating material, 10, in which the solid may be supported on blocks 11. The refrigerator may have a closely fitting removable section, 13, through which solid may be charged into the refrigerant box. The front edges of the side and bottom walls are preferably fitted air-tight against the front of the refrigerator, as shown, so that the bottom, side and back interspaces will be practically tight. The down passage, 8, between the partition walls, 7, 7, is of course closed in both front and back, as is also the refrigerant container, 9. The operation of this arrangement shown in Figs. 1 and 2 will be evident from the drawings. The closure, 13, being removed, the block of solid carbon dioxide will be charged into the refrigerant box, 9, and the cover 13 closed. The article or materials to be refrigerated, specifically food products, will be placed upon shelves, 14, 14, resting on suitable ledges, 15, 15. The solid carbon dioxide having an extremely low melting point, or rather, sublimating point, approximately −110° F., will absorb heat from its surroundings and will gasify. The gas will circulate in the paths shown by the arrows, gravitating through the down passage, 8, flowing laterally and rearwardly at the bottom, then upward in the interspaces, 8a, 8b, and 8c, at the sides and back, ultimately flowing over the upper edge of the side walls, 4, and back wall, 5, into the refrigerating space where the perishable products are stored. The dry gas in the refrigerant box, 9, will speedily displace all air and the remarkable insulating effect of said gas will then be available to retard conduction or convection of the heat from the walls, 9, to the refrigerant. In larger boxes, such as are to be entered by the operator, the overflow gas may be discharged outside the building or may be returned to the top of box 9, but the latter requires a closed circuit excluding air from the solid at all times, as shown in Fig. 5.

As before described, the warmer the gas is in the up-passages, 8a, 8b, 8c, the more rapid will be the gravity downflow of the colder gas in 8. This gravity flow will tend to create a slight suction at the top of the refrigerant box, 9, and air will flow in at 12, 12, from the relatively warm refrigerator spaces, which may be approximately 35° above zero as against 110° below zero at which the solid evaporates. As explained above, very small amounts of such air will effectively accelerate evaporation of the refrigerant besides lowering the temperature, thereby greatly augmenting the supply of refrigerant flowing downward in 8. Obviously, however, such rapid flow of the cold fluid into the up-passages will speedily bring the temperature down and the weight up more nearly to the temperature and weight of the gas in down-column 8, thus automatically checking the circulation and permitting the refrigerant box, 9, to refill itself with pure carbon dioxide, with resulting great increase of insulation of the solid.

Where the solid carbon dioxide is protected by a predetermined amount and gas-tightness of paper, pasteboard or other insulated wrappings, either within, or as a substitute for, the insulation 10, the gas evolution is necessarily modified by the fact that the wrappings maintain the solid carbon dioxide in an atmosphere of pure solid carbon dioxide gas. Consequently, the atmosphere circulating in heat exchange relation therewith will produce gas evolution only by heat absorption, by and in accordance with the temperature of the circulating atmosphere. This is because the paper or pasteboard wrappings preserve the solid carbon dioxide in an atmosphere of the pure gas evolved within the wrappings and, there being no actual contact between the atmosphere and the solid, there can be none of the peculiar accelerating action on the evaporation which is described elsewhere. While such accelerating action, proportional to the percentage of air in the circulation, is often highly desirable, particularly in a domestic refrigerator, it will be obvious that said percentage of air does not always or necessarily vary with the temperature within the refrigerator. Consequently, where the wrappings are used the gas evolution will be responsive solely to the temperature of the circulating atmosphere, and independent of what percentage of air it may have accidentally picked up. Simple conventional forms of the above described paper and pasteboard wrappings are shown in Figs. 8 and 7, respectively, an ordinary paper bag with its mouth folded over being shown in Fig. 8, and an ordinary pasteboard box being shown in Fig. 7. More perfect gas-tightness with somewhat less heat insulating quality will result, where the material of the box is sheet metal. In all cases, the insulating effect will be largely due to the pure dry cold gas which is thus retained as an insulating blanket around the solid carbon dioxide.

These qualities and functionings, dependent on the amount and gas-tightness of insulation in which the solid carbon dioxide is enclosed, may of course be utilized in any of the circulatory systems illustrated herein. Moreover, they have been made the basis of a specifically different apparatus and method set forth in my copending application Ser. No. 235,044, filed November 22nd, 1927.

While the counterbalance of the up-column of gas against the down-column thus affords very effective thermostatic control of a closely graduated sort, much sharper control may be had by arranging a valve, 17, to partially or wholly close or open the downflow passage, 8. Such valve may be operated by hand or, as diagrammatically indicated in the drawings, by means of a thermostat, 18, of the well known metallic bellows type.

In the use of the refrigerator for ordinary household purposes, any one of the doors, 2, 2a, 2b, may be opened at any time. If an upper door, 2, is opened, only the carbon dioxide above the lower edge of that door opening can spill out and with the central partition as shown, only the gas on one side of the partition will spill. If the middle door, 2, is open, the corresponding compartment may be drained and if left open long enough, some, or even most, of the gas may leak out from the compartment above it. Similarly if a lower door, 2b, is opened, its compartment and also the middle and upper compartments above the same may also be drained. Drainage of upper compartments through lower doors may be minimized, however, by making the shelves of sheet metal, substantially fitting the cross-section of the chamber, their front edges fitting as closely as practicable the doors, in addition to the fit at the sides and edges.

Under all these conditions, and even if all of the doors be opened and the entire refrigerating space is drained, it is still impossible to unduly warm up the side and back walls, 4, 5, or the partition wall, 7, and there will be at all times a substantial volume of cold gas in contact therewith ready to reduce them immediately to standard low temperature, the instant the doors are closed and the walls can again work on a single body of confined atmosphere. Thereupon the refilling of the refrigerating space with carbon dioxide will proceed at a pace which will be accelerated in proportion to the amount of heat that was permited to enter the refrigerating space while the doors were open.

It should be clearly understood that re-cooling by discharge of cold carbon dioxide into the refrigerating space to expel the warm air is far quicker and more effective than any method whatever that depends on abstracting heat from said air instead of expelling it.

A much simpler arrangement adapted for application to almost any refrigerant box of any size or shape is indicated in Fig. 3. Here the back wall of the interlining and the cross-flow beneath the floor are both eliminated, the refrigerating surfaces being limited to the sides of the space to be refrigerated, the apparatus comprising a sheet metal construction embodying the refrigerant box, 9a, and a thin, deep box member, 8x, the latter affording the downflow passage for the gas evaporated in the box 9. A corresponding flat box, 8y, of the same face area as 8x, 9a, is connected therewith by the bottom cross-flow pipe 20. This connection is made detachable by employing an ordinary pipe coupling, 21. The member 8x, is fitted against one interior side wall of the refrigerator and 8y against the opposite wall. The pipe 20 will be of suitable length to hold them against their respective walls. When in position, the parts are connected for operation by screwing up coupling 21. The upright members are held against their respective walls, by pipe 20, acting as a distance rod, and at a higher level shelves on the ledges 22 serve the same function. Additional securing means may be employed if desired. As shown, the top of the refrigerant box, 9a, and also the top of the member, 8x, are both shown as open to permit the above described thermo circulation. If it is desired to have thermostatic control other than the inherent thermo counterbalance described above, a thermostat may be applied as shown in Fig. 1, at the outlet of the refrigerant box or, as diagrammatically indicated at 17a, 18a, in Fig. 4, at the outlet of the up-column, or, as shown at 17b, 18b, in Fig. 5, in the cross-connection between the columns. When the latter is desired for the arrangement shown in Fig. 3, a valve controlled by a thermostat may be inserted at the point where the coupling 21 is shown.

A specifically different method of thermostatic control, which has certain advantages, is indicated in Fig. 6. In this figure, the top of the refrigerant box, 9a, is closed in by cover, 9b, having an upstanding inlet, 9c, adapted to be closed or opened by a balanced valve, 17x, controlled by a bellows thermostat, 18x. With this apparatus, gravity downflow in 8x cannot operate to suck in warm air at the top of the refrigerator box so long as 17x is closed. Consequently, the box is kept full of very cold highly insulating gas and evaporation is reduced to a minimum. In this situation, the circulation is so very slow that the up-column, 8y, may become very warm without having any tendency to accelerate down circulation in 8x, because 8x is in effect a barometric column sealed at the bottom by a U-bend of the conduit. Hence, the pressure differential takes effect merely as a suction on closed valve 17x, at the upper end of said barometric column. In this situation, opening of valve 17x by thermostat, 18x, permits all the accumulated differential to operate instantly, the suction drawing in warm air through 9c to rapidly melt the solid carbon dioxide, and the accumulated cold gas flowing with corresponding rapidity downward through 8x, across and up through 8y, the other leg of the U, and from the top of 8y it flows down into the refrigerating space.

From the above, it will be evident that the preferred forms of my apparatus include a U-conduit arrangement affording counter-balancing columns of the carbon dioxide gas; that the refrigerant gas evolution being in one of said legs, preferably but not necessarily localized at the top thereof, there is a perpetual tendency of the column in said generator leg to overbalance the other column and cause outflow at the upper end thereof, even though the upper ends of both legs may be at the same level and both open to atmosphere. Furthermore, the bottom of the U-bend is like a water-sealed plumber's trap in that the heavy gas settling thereto by gravity from the generator leg, operates as a heavier fluid seal to prevent reverse flow or bubbling back of warmed gas or air from the other leg. Hence, the generator leg is characteristically a downflow leg discharging through the other leg which is therefore characteristically an upflow leg; and when the upper end of said generator leg is sealed as in Fig. 6, a substantial below-atmosphere condition may be then maintained, because of the heavy gas seal in the bottom of the U-conduit.

It will be evident that a very short up-leg 8y, that is a J-shaped arrangement, would be effective for sealing the apparatus against reverse flow or bubbling back of lighter gas or air into the up-leg 8x.

In referring to the above arrangements as U-type and J-type, it will be evident the relative cross-sectional areas of the legs and of the lateral connection between them are disregarded because it is a fundamental principle of fluids that the gravity pressures with resulting counter-balances or differentials between communicating columns, depend upon the vertical heights of the columns and specific gravities of fluid in said columns. Hence inherent thermo-counterbalance control in Fig. 1 is the same in kind as in Fig. 3, although in Fig. 1 the horizontal cross-sectional area of the up-leg extending around three walls of the refrigerator may be approximately 4 times the cross-section of the down-leg 8, whereas in Fig. 3 these areas are approximately the same. The difference is, therefore, one of degree, the much greater heat absorbing surface of up-leg in Fig. 1 tending to keep the gas column in that leg proportionally warmer and therefore of less specific gravity.

From the above explanation of the broad principles of my method, it will be evident that it may be utilized in various specific forms of apparatus disclosing a vast number of specific variations as to horizontal sectional areas of the columns; conductivities and radiating rates of the upflow column, as determined by the materials of the walls thereof or the degree of insulation of said materials; and as to location and relative arrangement of the refrigerant containing box, the down-column and the up-column, each with reference to the other. In general, decrease of heat absorbing capacity of the down-column in any of the known ways, as by small cross-section or cylindrical cross-section or insulation will tend to great weight and low specific gravity of the down-column, and consequently to a lower temperature of the upflow or actively heat absorbing column, while great heat absorbing capacity for the up-column, as by highly conducting walls of great area as compared with the flow section, will promote activity of circulation. As a specific illustration, this principle would contemplate employing a pipe connection, like the pipe 21 in Fig. 3, extending upward so as to constitute the downflow column, as well as the cross-flow column. Such a pipe could be used in place of the partition conduit 8 in Fig. 1. A unitary generator and radiator unit may consist of a down-leg tank such as shown in Fig. 4, protected on one or more sides or completely surrounded by insulation x and said insulation may consist partly or wholly of an upflow leg. In Figs. 1 and 2, the upflow space, 8c, at the rear, may be omitted or may be partitioned from spaces 8a, 8b, thus making the latter two separate upflow legs each independently responsive to different heat conditions in the spaces on the respective opposite sides of partition 7, 7. In general, there may be as many separate or parallel connected up-legs and down-legs as may be desired.

In Fig. 6 I have diagrammatically indicated two upflow columns operating in parallel from the same source of carbon dioxide gas. Moreover, each of the up-conduits, 8y, is provided with a telescoping extension, 8z, whereby the height of said columns can be adjusted to the same level or to different levels, either above or below the level of the top of the refrigerant container.

I claim:

1. The method of control of evaporation of solidified carbon dioxide which includes causing it to evaporate in a container the top of which is arranged to draw a mixture of carbon dioxide gas and atmospheric air from the refrigerated space, draining the resultant gas to form a down-flow static column and to form an upflow counterbalancing column, and varying the height of the latter with reference to the height of the container and downflow column, for the purpose described.

2. In combination, a receptacle comprising a chamber to be cooled, a container in the upper portion thereof enclosing solidified carbon dioxide protected by relatively gas-tight paper or pasteboard wrapping, a downflow conduit from said container in heat exchange relation with said chamber, and an outlet conduit connected to said downflow conduit and extending upwardly, said conduits cooperating to control circulation of generated carbon dioxide gas.

3. In combination, a receptacle comprising a chamber to be cooled, a container in the upper portion thereof enclosing solidified carbon dioxide protected by relatively gas-tight paper or pasteboard wrapping, a downflow conduit from said container in heat exchange relation with said chamber, and an outlet conduit connected to said downflow conduit and extending upwardly, said conduits cooperating to control circulation of generated carbon dioxide gas, one of said conduits constituting a wall of the chamber.

4. In combination, a receptacle comprising a chamber to be cooled, a container in the upper portion thereof enclosing solidified carbon dioxide protected by relatively gas-tight paper or pasteboard wrapping, a downflow conduit from said container, in heat exchange relation with said chamber, and an outlet conduit connected to said downflow conduit and extending upwardly, said conduits cooperating to control circulation of generated carbon dioxide gas, said conduits constituting walls of the chamber.

5. In combination, a receptacle comprising a chamber to be cooled, a container in the upper portion thereof enclosing solidified carbon dioxide protected by relatively gas-tight paper or pasteboard wrapping, a downflow conduit from said container in heat exchange relation with said chamber, and an outlet conduit connected to said downflow conduit and extending upwardly, said conduits cooperating to control circulation of generated carbon dioxide gas, and the upwardly extending outlet conduit being formed and provided with means for varying the height of its gas overflow outlet.

6. In combination, a receptacle comprising a chamber to be cooled, a container in the upper portion thereof enclosing solidified carbon dioxide, a downflow conduit from said container in heat exchange relation with said chamber, and an outlet conduit connected to said downflow conduit and extending upwardly, said conduits cooperating to control circulation of generated carbon dioxide gas, and means for varying the difference in height between the outlet of the upwardly extending conduit and the inlet of the container for the solidified carbon dioxide.

7. In combination, a receptacle comprising a chamber to be cooled, a container in the upper portion thereof enclosing solidified carbon dioxide, a downflow conduit from said container and a plurality of upwardly-extending, spaced-apart outlet conduits connected to said downflow conduit, whereby when said conduits are at different temperatures the escape of gas will tend to be mainly through the outlet of whichever conduit has the highest temperature.

8. The method of control of temperature in a refrigerated enclosure by evaporation of solidified carbon dioxide which comprises establishing a refrigerating source of solid carbon dioxide having desired modified maximum normal rate of evaporation, said modification of the normal rate of evaporation of said carbon dioxide being effected by providing a confining wall affording predetermined protection against absorbing heat directly from an area being refrigerated while permitting access to the carbon dioxide of air or air gas mixture, and controllably decreasing the normal maximum rate as predetermined by controllably decreasing access of the air or air gas mixture to said solid by the amount and tightness of an insulating medium additionally and closely containing the carbon dioxide within the space provided by the confining wall.

Signed, at New York, in the county of New York, and State of New York, this 20th day of March, A. D. 1930.

JAMES W. MARTIN, Jr.